United States Patent [19]  [11] 4,293,661
Probst et al.  [45] Oct. 6, 1981

[54] LOW MOLECULAR WEIGHT ACRYLATE RESINS CONTAINING HYDROXYL AND TERTIARY AMINO GROUPS

[75] Inventors: Joachim Probst, Cologne; Michael Sonntag, Odenthal; Günter Kolb, Leverkusen, all of Fed. Rep. of Germany

[73] Assignee: Bayer Aktiengesellschaft, Fed. Rep. of Germany

[21] Appl. No.: 108,349

[22] Filed: Dec. 31, 1979

[30] Foreign Application Priority Data

Jan. 9, 1979 [DE] Fed. Rep. of Germany ....... 2900592

[51] Int. Cl.$^3$ .......................... C08F 8/08; C08F 8/32; C08G 18/62
[52] U.S. Cl. ................................. 525/127; 260/30.2; 260/31.2 N; 525/329; 525/375; 525/380
[58] Field of Search ............... 525/380, 127, 329, 375; 260/30.2, 31.2 N

[56] References Cited

U.S. PATENT DOCUMENTS

| | | | |
|---|---|---|---|
| 2,949,445 | 8/1960 | Blake | 525/380 |
| 3,959,237 | 5/1976 | Blank | 525/380 |
| 3,969,327 | 7/1976 | Stein et al. | 525/380 |
| 4,049,607 | 9/1977 | Berghoff | 525/380 |
| 4,205,148 | 5/1980 | Tatsukami et al. | 525/380 |
| 4,215,029 | 7/1980 | Saunders et al. | 525/380 |

*Primary Examiner*—William F. Hamrock
*Attorney, Agent, or Firm*—Connolly and Hutz

[57] ABSTRACT

A reaction product of an acrylate resin containing glycidyl groups and secondary mono-amines containing hydroxyl groups, obtained by reacting of said acrylate resin of copolymerized, statistically distributed units of (A) 3 to 30% by weight of the glycidyl ester of (meth)acrylic acid and/or of vinyl glycidyl ether;
(B) 0 to 20% by weight of at least a hydroxy $C_2$–$C_4$ alkyl ester of (meth)acrylic acid;
(C) 5 to 80% by weight of at least an optionally substituted styrene, methyl methacrylate, (meth)acrylonitrile or any mixture thereof;
(D) 5 to 70% by weight of an acrylic acid $C_1$–$C_{12}$-alkyl-or of a methacrylic acid $C_2$–$C_{12}$-alkyl ester or any mixture thereof; and
(E) 0 to 10% by weight of an $\alpha,\beta$-mono-olefinically unsaturated monocarboxylic or dicarboxylic acid containing from 3 to 5 carbon atoms or of a maleic acid $C_2$–$C_{14}$-mono ester or any mixture thereof, with at least one secondary mono-amine containing at least one secondary hydroxyl group. The reaction products are useful for crosslinking polyisocyanates.

1 Claim, No Drawings

LOW MOLECULAR WEIGHT ACRYLATE RESINS CONTAINING HYDROXYL AND TERTIARY AMINO GROUPS

This invention relates to heterocrosslinkable low molecular weight acrylate resins containing hydroxyl groups and tertiary amino groups and having a relatively low heterogeneity index.

Acrylate resins such as these are eminently suitable for use as a crosslinking component for compounds containing or capable of forming more than one isocyanate group.

It is known from the literature (B. Ranby, Journal of Polymer Science, Polymers Letters Ed. Vol. 15, Pages 687 to 692 (1977)) that polyhydroxy polyacrylates can be obtained by reacting copolymers containing glycidyl methylacrylate units with diethanolamine (cf. also U.S. Pat. No. 2,949,445). In this case, methyl methacrylate is used as the comonomer. The copolymers thus produced are used as antistatic agents. In cases where similar hydroxyl-containing polymers produced with diethanolamine are used as lacquer binders in admixture with suitable commercial polyisocyanates, the generally very short pot life and the poor dilutability with aromatic hydrocarbons, such as toluene or xylene for example, are disadvantages.

Accordingly, an object of the present invention is to provide a new process for the production of hydroxyl-containing polyacrylates in which the above-mentioned disadvantages, such as short pot life and poor dilutability, are eliminated.

According to the invention, this object is achieved by the reaction products described in detail hereinafter.

Accordingly, the present invention provides reaction products of acrylate resins containing glycidyl groups and secondary mono-amines containing hydroxyl groups, characterised in that an acrylate resin of copolymerised, statistically distributed units of (A) 3 to 30% by weight of the glycidyl ester of acrylic acid or methacrylic acid or of vinyl glycidyl ether, or any mixture thereof;

(B) 0 to 20% by weight of a hydroxyalkyl ester of acrylic acid or methacrylic acid containing from 2 to 4 carbon atoms in the hydroxyalkyl radical, or any mixture thereof;

(C) 5 to 80% by weight of styrene, α-methyl styrene, o-chlorostyrene, p-chlorostyrene, o, m, p-methyl styrene, p-tert.-butyl styrene, methyl methacrylate, acrylonitrile or methacrylonitrile, or any mixture thereof;

(D) 5 to 70% by weight of an acrylic acid ester containing from 1 to 12 carbon atoms in the alcohol radical or of a methacrylic acid ester containing from 2 to 12 carbon atoms in the alcohol radical, or any mixture thereof; and (E) 0 to 10% by weight of an $\alpha,\beta$-mono-olefinically unsaturated monocarboxylic or dicarboxylic acid containing from 3 to 5 carbon atoms or of a maleic acid mono-ester containing from 2 to 14 carbon atoms in the alcohol radical, or any mixture thereof, has been reacted with at least one amine containing hydroxyl groups corresponding to the formula:

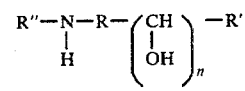

in which
n = 1 to 4 preferably 1 or 2,
R represents a single bond or an alkylene group containing from 1 to 4 carbon atoms, preferably from 1 to 2 carbon atoms,
R' represents an alkyl group containing from 1 to 4 carbon atoms and preferably from 1 to 2 carbon atoms,
R'' represents alkyl containing from 1 to 4 carbon atoms and preferably from 1 to 2 carbon atoms or a group of the formula:

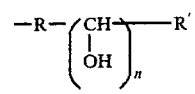

or R and R' together with

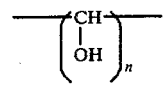

represent an alicyclic 5-membered or 6-membered ring,

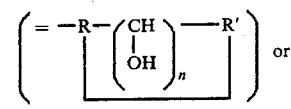

R' and R'' together with

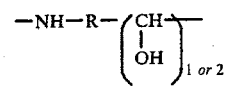

represent a pyrrolidine or piperidine ring, at a temperature of from 50° to 200° C. in such a ratio that one epoxide equivalent of the acrylate resin has reacted with from 0.7 to 1 NH-equivalent of the amine containing hydroxyl groups, with the OH-functions remaining largely intact.

The present invention also relates to the use of the above-defined reaction products as a crosslinking component for compounds containing or capable of forming more than one isocyanate group.

The acrylate resins are preferably copolymers of copolymerised, statistically distributed units of (A) 3 to 25% by weight of glycidyl methacrylate, glycidyl acrylate or mixtures thereof;

(B) 0 to 15% by weight of 2-hydroxyethyl acrylate, 2-hydroxyethyl methacrylate, 2-hydroxypropyl acrylate, 2-hydroxypropyl methacrylate, 4-hydroxybutyl(meth)acrylate or mixtures thereof;

(C) 5 to 60% by weight of styrene, acrylonitrile or methyl methacrylate or mixtures thereof;

(D) 10 to 60% by weight of ethyl acrylate, n-butyl acrylate, n-butyl methacrylate 2-ethylhexyl acrylate or 2-ethylhexyl methacrylate or mixtures thereof; and (E) 0 to 5% by weight of acrylic acid or methacrylic acid.

The amines containing hydroxyl groups used in accordance with the invention are preferably hydroxyalkyl amines corresponding to the formula:

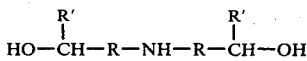

in which

R represents an alkylene group containing 1 or 2 carbon atoms, and

R' represents an alkyl group containing 1 or 2 carbon atoms.

The reaction products of the acrylate resin and amine containing hydroxyl groups preferably contain from 0.8 to 0.95 NH-equivalents of the amine per epoxide equivalent of the acrylate resin.

One epoxide equivalent is understood to be the quantity of acrylate resin in grams which contains one mole of 1,2-epoxide group (=one glycidyl group).

One NH-equivalent is understood to be the quantity of amine in grams which is given by the quotient of the molecular weight of the amine and the number of hydrogen atoms attached to the amine nitrogen.

The acrylate resins may be produced by polymerisation using known processes, for example as described in German Offenlegungsschrift No. 2,703,311 or in German Offenlegungsschrift No. 2,460,329, preferably in solution or bulk. The solvents used are, for example, aromatic hydrocarbons such as benzene, toluene, xylene, or chlorobenzene, esters such as butyl acetate, ethyl acetate, ethyl glycol acetate or methyl glycol acetate, ethers such as butyl glycol, tetrahydrofuran, dioxane, or glycol ether, ketones such as acetone or methyl ethyl ketone, and halogen-containing solvents, such as methylene chloride or trichloromonofluoroethane. Suitable initiators for producing the polyacrylate resins are those compounds of which the half life of the radical decomposition process at 80° to 160° C. amounts to between 0.01 and 100 minutes. In general, the copolymerisation reaction is carried out at temperatures in the range just mentioned and preferably at temperatures in the range of from 100° C. to 160° C. under a pressure of from $10^3$ to $2.10^4$ mbars, the exact temperature being governed by the type of initiator used. The initiators are generally used in quantities of from 0.05 to 6% by weight, based on the total quantity of monomers. In general, at least 98% of the monomers used are converted.

Suitable initiators are, for example, aliphatic azo compounds, such as azoisobutyronitrile, and peroxides such as, for example, benzoyl peroxide, tert.-butyl perpivalate, tert.-butyl peroctoate, tert.-butyl perbenzoate, tert.-butyl hydroperoxide, di-tert.-butyl peroxide, cumene hydroperoxide and also the dicyclohexyl and dibenzyl peroxy dicarbonate.

The monomers are incorporated into the copolymer in substantially the same ratios as used for polymerisation, the copolymerized units being substantially statistically distributed.

The acrylate polymers generally have average molecular weights $M_n$ of from 1000 to 10,000 and preferably from 2000 to 6000 and their solutions in xylene and/or n-butyl acetate generally have a viscosity at 20° C. of from about 10 to $10^4$ mPa.s, depending on the concentration.

The reaction of the acrylate resins with the amines containing hydroxyl groups is carried out at temperatures in the range of from 50° to 200° C. and preferably at temperatures in the range of from 70° to 120° C. The molar ratio of amine to oxirane groups generally amounts to between 1:1 and 1.3:1, i.e. from 1 to 1.3 NH-equivalents of the amine are used per epoxide equivalent of the acrylate resin for the reaction.

The course of the reaction may be followed by extracting and titrating the free amine with hydrochloric acid and also by determining the nitrogen content of the copolymer. A formula conversion of at least around 70%, based on the oxirane groups, must generally be reached in order to obtain reasonable pot lives of more than 15 hours (as determined at room temperature) and clear solutions of the binder mixtures.

Whereas the reaction is extremely slow at temperatures of or below 70° C. (in many cases, a 90% formula conversion is only obtained after more than 24 hours), the same conversion is obtained after only a few hours at temperatures of 90° C. and higher. The viscosity of the polymer solution increases during the reaction by about one power of ten to approximately $10^3$ to $10^5$ mPa.s, depending on the solids content. Unreacted amine may remain in the reaction product.

The molecular weights determined by vapour pressure osmometry or gel permeation chromatography are generally in the range of from 1000 to 10,000 and preferably in the range of from 2000 to 6000. The OH-numbers are generally in the range of from 20 to 250 and preferably in the range of from 50 to 150 (mgKOH/g substance).

It is essential for the amines used to contain a secondary amino group and at least one secondary hydroxyl group. This is because, if they contain primary rather than secondary amino groups, intermolecular branches and crosslinks are formed very easily during the reaction with polyacrylates containing glycidyl groups and can lead to gelated products. In addition, the presence of secondary hydroxyl groups is of crucial importance because it largely prevents undesirable secondary reactions of the hydroxyl groups with the oxirane groups of the prepolymer. In addition, the presence of the secondary hydroxyl groups limits the reactivity with the polyisocyanates used as crosslinking component to such an extent that good pot lives of at least 15 hours are obtained. The following amines are mentioned as examples of the amines containing hydroxyl groups thus characterised: di-(2-hydroxypropyl)-amine, di-(2-hydroxybutyl)-amine, di-(3-hydroxybutyl)-amine, N-methyl-2-aminopropanol and N-ethyl-2-aminopropanol.

Suitable reaction components for the hydroxyl-containing acrylate resins according to the invention for the production of coatings are standard commercially available lacquer-grade polyisocyanates the production of which is described for example in the following Patent Specifications: U.S. Pat. Nos. 3,124,605; 3,358,010; 3,903,126; 3,903,127; 3,976,622; 3,183,112; 3,394,111; 3,645,979; 3,919,218; British Pat. Nos. 1,060,430; 1,234,972; 1,506,373 and 1,458,564.

The lacquer-grade polyisocyanates in question are polyisocyanates containing biuret groups, urethane groups and isocyanurate groups. The quantitative ratios of the coating compositions consisting of polyol and crosslinking component are selected in such a way that from 0.2 to 5 and preferably from 0.7 to 1.3 isocyanate groups are available for every hydroxyl group of the hydroxyl-containing components present in the reaction mixture. Basically, it is also possible for the isocyanate component used to be blocked by blocking agents for isocyanate groups, such as for example phenols, ε-caprolactam, malonic acid diethyl ester or acetoacetic acid ethyl ester, so that the coating compositions obtained in this way represent heat-crosslinkable stoving lacquers.

It is also possible to use so-called reactive diluents during or after the production of the hydroxyl-containing acrylate resins according to the invention. These so-called reactive diluents are in particular low molecular weight diols or polyols which do not take part in the polymerisation reaction, but which are reactive to isocyanate groups and, hence, are incorporated into the polyurethane. In addition to the suitable reactive diluents disclosed in German Auslegeschrift No. 2,304,893, hydroxyl-containing amines used in excess may of course also be regarded as reactive diluents. However, they should not be present in quantities larger than 3% by weight, based on the polyacrylate, in order to avoid clouding of the polyol/crosslinker mixture and the hardened lacquer films. The reactive diluents mentioned in German Auslegeschrift No. 2,304,893 are used in addition to or instead of the above-mentioned solvents in quantities of from 0 to 50% by weight, based on the monomer mixture.

In addition to the already mentioned solvents or reactive diluents, the coating compositions may contain other auxiliaries and additives of the type commonly encountered in polyurethane lacquer technology, such as for example levelling agents based on cellulose esters, oligo-alkyl acrylates, silicone oils, plasticisers such as phosphoric acid esters, phthalic acid esters, pigments and fillers, viscosity-controlling additives, such as bentonites and silicic acid esters, dulling agents, hardening accelerators, such as manganese, lead or cobalt naphthenates, tin accelerators, calcium salts, zinc salts, bases such as diazabicyclo-octane, acids such as phosphoric acid, ethanolic hydrochloric acid, tartaric acid or citric acid, in quantities of from about 0.1 to 20% by weight, based on the total quantity of the coating composition.

The coating compositions used may be applied by any of the methods normally used in lacquer technology, for example spray coating, spread-coating, dip-coating or roll coating to any substrates such as, for example, metals, wood, masonry, concrete, glass, ceramics, plastics, textiles or paper. They are distinguished by long pot lives, fast drying times, good levelling, colour fidelity and clarity and by the outstanding mechanical properties of the coatings obtained with them.

Another advantage of the acrylate resins according to the invention is that, even with very high hydroxyl contents (more than 5% by weight, based on acrylate resin), the polyol-crosslinker mixtures may readily be diluted with a large number of standard lacquer solvents, particularly aromatic hydrocarbons such as toluene or xylene, without any signs of clouding.

The invention is illustrated by the following Examples in which the percentages quoted represent percentages by weight unless otherwise stated.

EXAMPLES 1 TO 5

Production of glycidyl-containing copolymers:

8133 parts by weight of xylene are introduced under nitrogen into a 40 liter stirrer-equipped autoclave and heated to 120° C. At this temperature, which is kept under control, the solutions having the compositions indicated in Table 1 are then added over a period of about 4 hours in the absence of air. 93 parts by weight of t-butyl perbenzoate dissolved in 4067 parts by weight of n-butyl acetate are added for post-activation. After stirring for 6 to 8 hours at 120° C., the concentrations, viscosities and conversions also indicated in Table 1 are obtained.

TABLE 1

| Example No. | 1 | 2 | 3 | 4 | 5 | |
|---|---|---|---|---|---|---|
| Glycidyl methacrylate | 3131 | 3131 | 3131 | 3131 | 3131 | |
| Styrene | 7167 | 8585 | 9199 | 7867 | — | Parts |
| n-Butyl acrylate | 5099 | 3680 | 3067 | 3067 | 3067 | by Weight |
| Methyl methacrylate | — | — | — | 1333 | 9200 | |
| t-Butyl peroctoate | 500 | 500 | 500 | 500 | 500 | |
| Conversion | 98.0 | 98.5 | 98.3 | 98.7 | 99.2 | % by weight |
| Concentration | 54.8 | 56.3 | 56.5 | 55.7 | 55.9 | |
| Viscosity (at 20° C.) | 450 | 500 | 570 | 1100 | 3050 | mPa.s |

The copolymer contains copolymerised units of the following monomers in percent by weight:

| | Styrene | n-Butyl acrylate | Methyl methacrylate | Glycidyl methacrylate |
|---|---|---|---|---|
| Example 1 | 46.55 | 33.12 | — | 20.34 |
| Example 2 | 55.76 | 23.90 | — | 20.34 |
| Example 3 | 59.75 | 19.92 | — | 20.34 |
| Example 4 | 51.09 | 19.92 | 8.66 | 20.34 |
| Example 5 | — | 19.92 | 59.75 | 20.34 |

Reaction of the copolymers with amines containing OH-groups:

The copolymers of Examples 1 to 5 are respectively mixed while stirring with the quantities of hydroxyalkyl amine indicated in Table 2 at 70° C., 80° C. and 90° C. This is followed by stirring for 48 hours at 70° C., for 30 hours at 80° C. and for 24 hours at 90° C. In Examples 4 and 5, stirring is only carried out for 24 hours at 90° C. Shorter stirring times are, of course, possible (cf. Example 6). Clear, pale yellowish coloured polyacrylate solutions (colour values 3–4) having the properties also indicated in Table 2 are obtained.

TABLE 2

| Example No. | Di-(2-hydroxypropyl)-amine (parts by weight) | Reaction temperature (°C.) | Concentration (% by weight) |
|---|---|---|---|
| 1 a | 3372 | 70 | 59.7 |
| 1 b | 3372 | 80 | 63.4 |
| 1 c | 3372 | 90 | 63.2 |
| 2 a | 3372 | 70 | 63.0 |
| 2 b | 3372 | 80 | 62.5 |
| 2 c | 3372 | 90 | 62.2 |
| 3 a | 3372 | 70 | 62.6 |
| 3 b | 3372 | 80 | 61.5 |
| 3 c | 3372 | 90 | 63.5 |
| 4 | 3372 | 90 | 64.2 |
| 5 | 3372 | 90 | 65.0 |

| Example No. | Conversion, based on oxirane groups /% | Viscosity (mPa.s) | OH-number (mgKOH/g solution) |
|---|---|---|---|
| 1 a | 99.5 | 4730 | 130 |
| 1 b | 99.5 | 10000 | 123 |
| 1 c | 99.0 | 9500 | 132 |
| 2 a | 99.3 | 11700 | 132 |
| 2 b | 99.5 | 10600 | 131 |
| 2 c | 99.0 | 11500 | 132 |
| 3 a | 99.0 | 14400 | 134 |
| 3 b | 99.5 | 10400 | 132 |
| 3 c | 99.2 | 18400 | 132 |
| 4 | 93.5 | 23400 | 133 |
| 5 | 93.2 | 63500 | 137 |

COMPARISON EXAMPLE 1

(With diethanolamine as the hydroxyalkyl amine)

The prepolymer is prepared with the same quantities of monomer and in the same way as described in Example 1. Thereafter, 2662 parts by weight of diethanolamine are added with stirring at 90° C. followed by stirring for 24 hours at that temperature. A clear, pale yellowish solution having the following properties is obtained:

| Conversion: (based on oxirane groups) | approximately 99.0% |
|---|---|
| Concentration: | 60.3% by weight |
| Viscosity: | 5700 mPa.s |
| OH number: | 135 |

EXAMPLE 6

1220 parts by weight of xylene are introduced under nitrogen into a 6 liter stirrer-equipped autoclave, followed by heating to 120° C. At this temperature, which is kept under control, the following mixture is added over a period of about 4 hours in the absence of air:

| Glycidyl methacrylate: | 470 parts by weight |
|---|---|
| Styrene: | 1380 parts by weight |
| n-butyl acrylate: | 460 parts by weight |
| t-butyl peroctoate | 75 parts by weight |

14 parts by weight of t-butyl perbenzoate dissolved in 610 parts by weight of n-butyl acetate are then added for post-activation. This is followed by stirring for 6 to 8 hours at 120° C. The mixture is then cooled to 90° C., 613 parts by weight of di-(2-hydroxybutyl)-amine are added and the mixture is stirred for 12 hours at this temperature of 90° C. A clear, pale yellowish solution with the following properties is obtained.

| Conversion (based on oxirane groups): | 98.0% |
|---|---|
| Concentration: | 61.8% by weight |
| Viscosity: | 5120 mPa.s |
| OH-number: | 120 |

The copolymer consists of copolymerised units (in percent by weight) of 59.74% by weight of styrene, 19.91% by weight of glycidyl methacrylate and 20.35% by weight of n-butyl acrylate.

The production of a few coating compositions suitable for use in accordance with the invention and their use is described in the following. The following starting materials were used in the following Examples: Acrylate resins according to Examples 1a, 1b, 1c to 6 and numbered accordingly, and Polyisocyanate I, a 75% by weight solution in xylene/ethyl glycol acetate (1:1) of a biuret polyisocyanate based on hexamethylene diisocyanate. This solution has an NCO content of 16.5%.

The lacquers described in the following Examples were clear lacquers having a solids content of approximately 40% by weight. They were additionally diluted with xylene or with a mixture of equal parts by weight of xylene, n-butyl acetate and ethyl glycol acetate. The individual components were used in quantities corresponding to an NCO/OH equivalent ratio of 1:1. No other additives were introduced.

EXAMPLE 7

Compatibility of the acrylate resins in two-component lacquers with polyisocyanate I (diluent:xylene)

| Acrylic resin | 1a | 1b | 1c | 2a | 2b | 2c | 3a | 3b | 3c | 4 | 5 | 6 | Comparison 1 |
|---|---|---|---|---|---|---|---|---|---|---|---|---|---|
| Solution | + | + | + | + | + | + | + | + | + | + | + | + | − |
| Film | + | + | + | + | + | + | + | + | + | + | + | + | − |

Compatibility symbols,
+ satisfactorily compatible
− incompatible

EXAMPLE 8

Pot life and viscosity behaviour of two-component lacquers of acrylate resins and polyisocyanate I

| Acrylate resin | 1a | 1b | 1c | 2a | 2b | 2c | 3a | 3b | 3c | 4 | 5 | 6 | Comparison 1 |
|---|---|---|---|---|---|---|---|---|---|---|---|---|---|
| Pot life in hours | 27 | 24 | 24 | 24 | 23 | 21 | 22 | 21 | 18 | 19.5 | 23.5 | 29 | 3.5 |
| Flow out time (DIN cup) in seconds after | | | | | | | | | | | | | |
| 0 hour | 18 | 18 | 19 | 18 | 18 | 18 | 19 | 19 | 20 | 19 | 18 | 19 | 19 |
| 4 hours | 19 | 18 | 19 | 19 | 19 | 20 | 20 | 20 | 20 | 20 | 18 | 19 | gelled |

-continued

| Acrylate resin | 1a | 1b | 1c | 2a | 2b | 2c | 3a | 3b | 3c | 4 | 5 | 6 | Comparison 1 |
|---|---|---|---|---|---|---|---|---|---|---|---|---|---|
| 8 hours | 20 | 20 | 20 | 20 | 20 | 20 | 20 | 20 | 23 | 21 | 20 |  | 21 |

+ diluent: Xylene/ethyl glycol acetate/n-butyl acetate

As can be seen, two-component lacquers of acrylate resins according to the invention and polyisocyanate have pot lives sufficient for practical purposes, whereas the product according to Comparison 1 gels after only 3.5 hours.

EXAMPLE 9

Elasticity and pendulum hardness of two-component lacquers of acrylate resin and polyisocyanate I:

| Acrylate resin | 1b | 1c | 2a | 2b | 2c | 3a | 3b | 3c | 4 | 5 |
|---|---|---|---|---|---|---|---|---|---|---|
| Erichsen indentation according to DIN 53156 after 14 days in mm | 9.3 | 9.3 | 9.3 | 9.1 | 9.1 | 9.1 | 9.1 | 8.6 | — | — |
| Pendulum hardness according to Konig in seconds according to DIN 53157 after 1 day | 76 | 60 | 94 | 108 | 108 | 106 | 121 | 120 | 73 | 101 |
| after 7 days | 193 | 193 | 197 | 199 | 197 | 196 | 196 | 199 | 195 | 182 |

The values for Comparison 1 were not measured because combinations such as these cannot be used in practice on account of their incompatibility and their inadequate pot lives.

We claim:

1. A composition comprising a compound which contains or is capable of forming more than one isocyanate group and; as a crosslinking component a reaction product of an acrylate resin containing glycidyl groups and a secondary mono-amine containing hydroxyl groups, obtained by reaction of said acrylate resin of copolymerised, statistically distributed units of
    (A) 3 to 30% by weight of the glycidyl ester of acrylic acid or methacrylic acid or of vinyl glycidyl ether, or any mixture thereof;
    (B) 0 to 20% by weight of a hydroxyalkyl ester of acrylic acid or methacrylic acid containing from 2 to 4 carbon atoms in the hydroxyalkyl radical, or any mixture thereof;
    (C) 5 to 80% by weight of styrene, α-methyl styrene, o-chlorostyrene, p-chlorostyrene o-, m- or p-methyl styrene, p-tert.-butyl styrene, methyl methacrylate, acrylonitrile or methacrylonitrile, or any mixture thereof;
    (D) 5 to 70% by weight of an acrylic acid ester containing from 1 to 12 carbon atoms in the alcohol radical or of a methacrylic acid ester containing from 2 to 12 carbon atoms in the alcohol radical, or any mixture thereof; and
    (E) 0 to 10% by weight of an α,β-mono-olefinically unsaturated monocarboxylic or dicarboxylic acid containing from 3 to 5 carbon atoms or of a maleic acid mono-ester containing from 2 to 14 carbon atoms in the alcohol radical, or any mixture thereof,
with at least one amine containing hydroxyl groups corresponding to the formula:

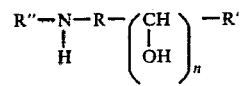

in which
n = 1 to 4,
R = a single bond or an alkylene group containing from 1 to 4 carbon atoms,
R' = alkyl containing from 1 to 4 carbon atoms,
R" = alkyl containing from 1 to 4 carbon atoms or

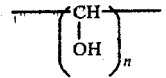

or in which
R and R' together with

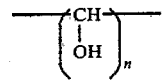

represent an alicyclic 5- or 6-membered ring

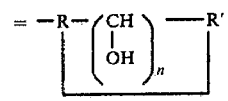

or R' and R" together with

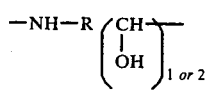
represent a pyrrolidine or piperidine ring, at a temperature of from 50° to 200° C. in such a ratio that one epoxide equivalent of the acrylate resin has been reacted with from 0.7 to 1 NH equivalent of the amine containing hydroxyl groups with the OH function remaining largely intact.
* * * * *